No. 863,087. PATENTED AUG. 13, 1907.
C. D. PARKER.
BEARING BOX.
APPLICATION FILED NOV. 27, 1903.

Witnesses:
C. F. Wesson
M. E. Regan

Inventor:
C. D. Parker.
By his Attorneys
Southgate & Southgate

THE NORRIS PETERS CO., WASHINGTON, D. C.

UNITED STATES PATENT OFFICE.

CHARLES D. PARKER, OF WORCESTER, MASSACHUSETTS.

BEARING-BOX.

No. 863,087.  Specification of Letters Patent.  Patented Aug. 13, 1907.

Application filed November 27, 1903. Serial No. 182,712.

*To all whom it may concern:*

Be it known that I, CHARLES D. PARKER, a citizen of the United States, residing at Worcester, in the county of Worcester and State of Massachusetts, have invented a new and useful Bearing-Box, of which the following is a specification.

This invention relates to a bearing for shafting which has been especially designed for use in engines, pumps, presses, or other machinery in which the parts are mounted in comparatively heavy or bulky frames.

The especial object of this invention is to provide a construction comprising a number of adjustable bearing pieces which are mounted in a frame in such a manner that the machine work for fitting the frame with the bearing may be done by boring out the frame, and without planing or other unnecessary handling of the frame.

To these ends, this invention consists of the bearing and of the combinations of parts therein as hereinafter described and more particularly pointed out in the claims at the end of this specification.

Figure 1:
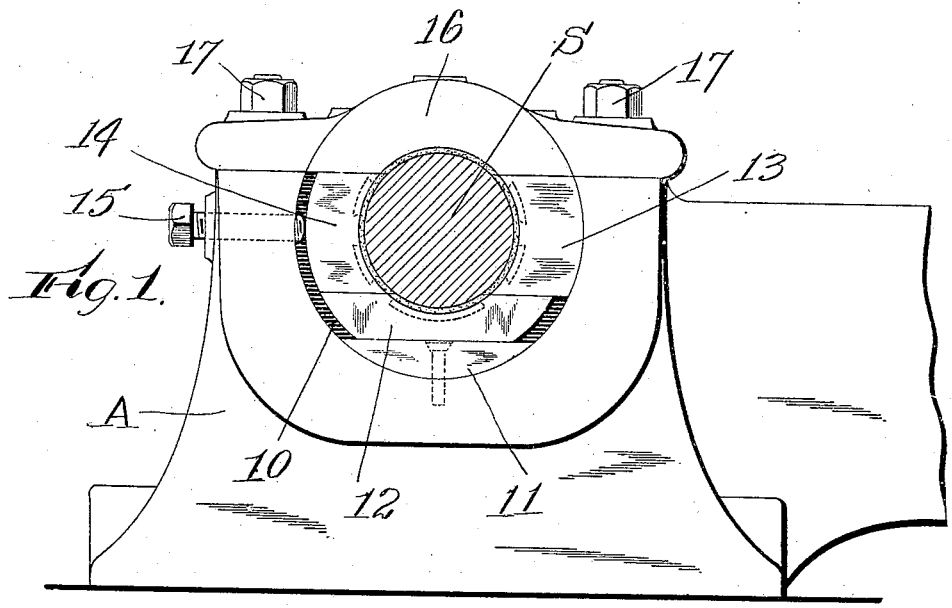
Figure 2:
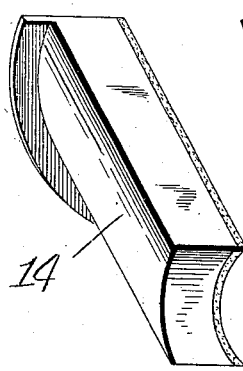
Figure 3:
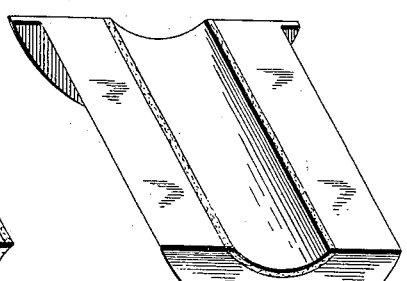
Figure 4:
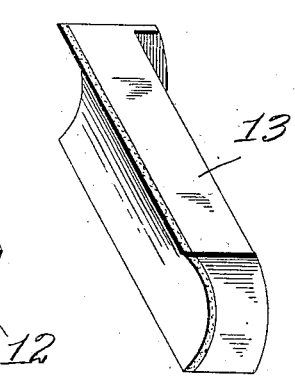
Figure 5:
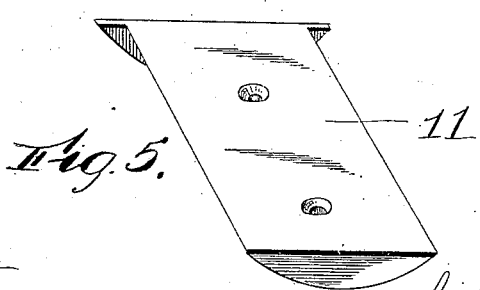

In the accompanying drawing, Figure 1 is a side view of sufficient parts of an engine frame to illustrate the application of my invention thereto. Fig. 2 is a perspective view of the adjustable cheek-piece of a bearing-box constructed according to this invention. Fig. 3 is a perspective view of the bottom section thereof. Fig. 4 is a perspective view of the fixed cheek-piece of a bearing box constructed according to this invention, and Fig. 5 is a perspective view of the segmental base-piece.

In making steam engines and other heavy machinery, the finishing of the frame-work was formerly done upon heavy metal planing machines. The use of planing machines for finishing the ways and other surfaces of an engine requires the bodily handling of the comparatively heavy engine frame castings.

In modern engine practice, the longitudinal ways and bearings of the engine are now ordinarily finished by means of a boring bar and horizontal boring machinery, so that by the use of boring tools for finishing the longitudinal bearings or ways of engine frame-work, engine builders have been enabled to do a large part of the work without moving the heavy engine frame casting.

The especial object of my present invention is to provide a form of bearing for an engine or other heavy machinery which will still further simplify the finishing of the frame work by providing a combination of adjustable bearing pieces which are fitted into a horizontally bored out socket or recess in the frame, which may be finished by horizontal boring operation without the bodily handling or shifting of the heavy frame casting.

To accomplish this object, the socket for a bearing constructed according to this invention is bored out substantially concentric with the shaft which is to be mounted therein. Fastened down in the bottom of this socket is a segmental bearing piece having a flat surface which forms the platform upon which the adjustable parts of the bearing may be moved to set up or tighten the bearing. Carried on the segmental base-piece is the bottom or grooved section which engages the bottom of the shaft, and which is narrower than the annular space between the shaft and the bearing socket in the frame; the stationary cheek-piece which is of the same width as the annular space between the shaft and the socket in the frame; and the adjustable cheek-piece which is narrower than the annular space referred to, and is held up into engagement with the shaft by thrust bolts. These parts are held in place by the cover or top of the bearing-box.

Referring to the drawing for a detail description of a shaft bearing constructed according to this invention, A designates part of an engine-frame which may be of any of the usual or ordinary designs. Bored in the engine-frame A is a socket 10 which is substantially concentric with the shaft. Secured in the bottom of the socket 10 is a segmental bearing piece 11 which may be fastened in place by screws as shown by dotted lines, and which has a flat upper surface forming the platform on which the other parts are adjustably mounted. Supported by the base-piece 11 is the bottom or grooved section 12 which engages the bottom of the shaft S. Supported by the piece 12 are the cheek-pieces 13 and 14. The cheek-piece 13 is of the same width as the annular space between the shaft S and the frame-work A so as to form a rigid bearing against the side of the socket 10. The cheek-piece 14 is narrower and is adjustably held up into engagement with the shaft by bolts 15. By means of this construction the base-piece 11 provides a flat surface on which the other parts may be adjusted to tighten up the bearing or to set the same as may be required.

The bearing pieces 12, 13 and 14 are preferably babbitted or otherwise provided with anti-friction surfaces, and the parts are held in place in the socket by the cover or cap 16 which is held down by nuts 17 threaded onto bolts in the ordinary manner.

In the construction I have herein illustrated, the bearing-pieces are provided with flanges at one end only, and this is all that is required when the crank-arm of the engine shaft prevents the bearing pieces from moving longitudinally out of place in one direction. It is obvious, however, that the bearing pieces may have flanges at each end if desired.

I am aware that numerous changes may be made in practicing this invention by those who are skilled in the art, and I do not wish, therefore, to be limited to the construction I have herein shown and described, but What I do claim and desire to secure by Letters Patent of the United States is:—

1. A bearing for shafting, comprising a frame having a socket substantially concentric with the shaft, a segmental base-piece secured in the bottom of the socket, and a bottom bearing piece having a bearing groove for the shaft mounted on the segmental base-piece and adjustable thereon transversely to the shaft.

2. In a bearing for shafting, the combination of a frame having a socket substantially concentric with the shaft, a segmental base piece secured in the bottom of the socket, and bearing pieces mounted thereon comprising a bottom section and cheek pieces engaging opposite sides of the shaft.

3. In a bearing for shafting, the combination of a frame having a socket substantially concentric with the shaft, a segmental base piece secured in the bottom of the socket, a bottom section for the shaft arranged on said base piece, and cheek pieces arranged on said bottom section, one of the cheek-pieces being of a thickness substantially corresponding to the annular space between the shaft and the frame, and the other cheek-piece being thinner, and means for holding this last named cheek-piece into engagement with the shaft.

4. In a bearing for shafting, the combination of a frame having a socket substantially concentric with the shaft, a segmental base-piece, screws fastening the base-piece in the socket, the upper surface of said base-piece forming a platform for supporting movable bearing-pieces, and bearing-pieces comprising a bottom section which may be shifted transversely on the segmental base-piece, a stationary cheek-piece engaging one side of the socket, bolts for holding the adjustable cheek-piece up into engagement with the shaft, and a cover holding said parts in place.

5. In a bearing for shafting, the combination of a frame having a socket, a base-piece secured in the bottom of the socket, a bottom bearing-piece for the shaft mounted on the base-piece and adjustable thereon transversely with respect to the shaft, and a pair of cheek pieces, one of said cheek pieces being of a size substantially corresponding to the space between the shaft and the wall of the socket and the other being smaller than said space and adjustable transversely with respect to the shaft.

6. In a bearing for shafting, the combination of a frame having a socket, a base-piece secured in the bottom of said socket and having a horizontal top surface, and a bottom bearing piece having a groove for receiving the shaft mounted on said base-piece and adjustable thereon transversely with respect to the shaft.

In testimony whereof I have hereunto set my hand, in the presence of two subscribing witnesses.

CHARLES D. PARKER.

Witnesses:
PHILIP W. SOUTHGATE,
JOHN F. CROWELL.